United States Patent

Martin

[19]

[11] Patent Number: 5,935,629
[45] Date of Patent: Aug. 10, 1999

[54] APPARATUS AND METHOD FOR CROSS-SCORING A DOUGH LOAF

[75] Inventor: David Allen Martin, Bolingbrook, Ill.

[73] Assignee: Campagna-Turano Bakeries, Inc., Berwyn, Ill.

[21] Appl. No.: 09/044,569

[22] Filed: Mar. 19, 1998

[51] Int. Cl.⁶ .............................. A21D 6/00; B26D 3/00
[52] U.S. Cl. .............................. 426/231; 83/879; 83/884; 99/485; 99/537; 425/291; 425/385; 426/503; 426/518
[58] Field of Search ........................... 426/231, 503, 426/518; 99/485, 537; 83/861, 879, 880, 884; 425/291, 385

[56] References Cited

U.S. PATENT DOCUMENTS

4,246,838  1/1981  Pulver et al. .............................. 99/516
4,876,934  10/1989  Fagan et al. .............................. 83/879

*Primary Examiner*—George Yeung
*Attorney, Agent, or Firm*—Dick and Harris

[57] ABSTRACT

An apparatus for scoring surfaces of objects, such as unbaked bread loaves, is provided. A tray is configured to hold unbaked bread loaves. A conveyor advances the tray along a transport path. Sensors detect the tray's presence and orientation. A control unit processes the detection signal's and controls a member that causes the tray to rotate. Two or more sets of knives located above the production line contact and score the upper surface of the bread loaves in different orientations. A mechanism realigns the tray on the conveyor.

26 Claims, 3 Drawing Sheets

Fig 1

APPARATUS AND METHOD FOR CROSS-SCORING A DOUGH LOAF

BACKGROUND OF THE INVENTION

1. The Technical Field

This invention relates generally to methods and apparatus used in the preparation of bread dough loaves for baking. In particular, this invention relates to a method and apparatus for scoring a surface of an unbaked bread dough loaf.

2. The Prior Art

It has long been a practice in the baking industry to score the upper surface of an unbaked bread loaf, to give the bread loaf a decorative appearance after it has been baked. For example, the well-known "split-top" bread loaf gains its appearance by virtue of having had its top surface scored longitudinally before being introduced to a baking oven. Other decorative appearances are achievable by scoring the unbaked bread loaf in various ways prior to baking. The diagonal split pattern commonly seen on long loaves is created by scoring the unbaked loaf diagonally at various points along its length. Criss-cross patterns may be achieved by scoring an unbaked bread loaf two or more times at varying angles.

In the past, such scoring operations have traditionally required significant manual intervention in the scoring process. That is, human intervention was typically required either to manipulate the unbaked bread loaves and/or to manipulate the scoring equipment.

Accordingly, it is desirable to provide a method by which unbaked bread dough loaves may be automatically scored with a minimum of human intervention.

It is also desirable to provide an apparatus which automatically scores unbaked bread loaves in a predetermined manner, with a minimum of human intervention.

SUMMARY OF THE INVENTION

The present invention is directed, in part, to an apparatus for cross-scoring upper portions of unbaked dough loaves. The apparatus comprises at least one tray configured to hold at least one dough loaf. A conveyance apparatus operably configured for transporting the at least one tray along a transport path. First means alter the orientation of the at least one tray, relative to the conveyance apparatus, while the at least one tray is being transported along the transport path, so as to shift the at least one tray from a first orientation relative to the conveyance apparatus, to a second orientation relative to the conveyance apparatus.

A first scoring tool is positioned downstream of the first means for altering the orientation of the at least one tray, and operably configured to place at least one first score line into at least one dough loaf, when at least one dough loaf is held within the at least one tray.

Second means alter the orientation of the at least one tray, relative to the conveyance apparatus, while the at least one tray is being transported along the transport path, and operably disposed downstream of the first scoring tool, so as to shift the at least one tray from the second orientation relative to the conveyance apparatus to a third orientation, relative to the conveyance apparatus.

A second scoring tool is positioned downstream of the second means for altering the orientation of the at least one tray, and operably configured to place at least one second score line into at least one dough loaf, when at least one dough loaf is held within the at least one tray.

In a preferred embodiment of the invention, the first means for altering the orientation of the at least one tray comprises a selectively positionable shifting member, which may be selectively shifted between a first position along the transport path of the at least one tray, so that when the shifting member is in the first position, the shifting member contacts and partially obstructs the at least one tray, as the at least one tray is transported along the transport path, causing the at least one tray to rotate relative to the conveyance apparatus, and a second non-obstructing position. A sensing apparatus is operably associated with the conveyance apparatus, and operably configured for actuating the shifting member to move between the first and second positions, in response to the location of the at least one tray along the transport path. The shifting member preferably comprises an extensible/compressible member.

The sensing apparatus preferably comprises a tray approach sensor, operably disposed to detect arrival of the at least one tray at a preselected position upstream of the shifting member. A tray rotation sensor may be operably disposed to detect arrival of a portion of the at least one tray at a preselected position downstream of the shifting member. A programmable control unit may be operably configured to actuate the shifting member to move to the first position when the tray approach sensor detects arrival of the at least one tray at the preselected position upstream of the shifting member and to actuate the shifting member to move to the second position when the tray rotation sensor detects arrival of the portion of the at least one tray at the preselected position downstream of the shifting member.

The tray approach sensor and tray rotation sensors may comprise photocells. Alternatively, the tray approach sensor and tray rotation sensors may comprise magnetic induction sensors.

The first scoring tool comprises at least one knife which is configured to cut at least one first slot into an upper surface of at least one dough loaf, when at least one dough loaf is held within the at least one tray. The at least one knife is circular. The at least one knife is rotatably mounted on an axle passing through the at least one knife's center. Alternatively, the at least one knife is fixedly mounted to an axle passing through the center of the knife, and the axle is operably configured to rotate about its longitudinal axis, to, in turn, rotate the knife.

The second means for altering the orientation of the at least one tray preferably comprise a hook, operably disposed relative to the conveyance apparatus, along the transport path, and operably configured to releasably engage a rear side wall of the at least one tray, as the at least one tray is transported along the transport path, to rotate the at least one tray about a first axis, and change the orientation of the at least one tray relative to the conveyance apparatus; and a bumper, operably disposed relative to the conveyance apparatus, at a position downstream of the hook, and operably configured to contact the at least one tray, after the tray has rotated a predetermined amount, and rotate the at least one tray about a second, different axis, to pivot the at least one tray away from the hook.

The second scoring tool preferably comprises at least one knife which is configured to cut at least one second slot into an upper surface of the at least one dough loaf, when the at least one dough loaf is held within the at least one tray.

The invention also is directed, in part, a method for cross-scoring upper portions of unbaked dough loaves. The method comprises the steps of:

provideing at least one tray configured to hold at least one dough loaf;

transporting the at least one tray with a conveyance apparatus along a transport path;

altering the orientation of the at least one tray, a first time, relative to the conveyance apparatus, while the at least one tray is being transported along the transport path, so as to shift the at least one tray from a first orientation relative to the conveyance apparatus, to a second orientation relative to the conveyance apparatus;

placing at least one first score line into at least one dough loaf, when at least one dough loaf is held within the at least one tray, with a first scoring tool, positioned downstream of the first means for altering the orientation of the at least one tray;

altering the orientation of the at least one tray, a second time, relative to the conveyance apparatus, while the at least one tray is being transported along the transport path, and operably disposed downstream of the first scoring tool, so as to shift the at least one tray from the second orientation relative to the conveyance apparatus to a third orientation, relative to the conveyance apparatus;

placing at least one second score line into at least one dough loaf, when at least one dough loaf is held within the at least one tray, with a second scoring tool, positioned downstream of the second means for altering the orientation of the at least one tray.

The step of altering, a first time, the orientation of the at least one tray comprises:

moving a selectively positionable shifting member, which may be selectively shifted between a first position along the transport path of the at least one tray, so that when the shifting member is in the first position, the shifting member contacts and partially obstructs the at least one tray, as the at least one tray is transported along the transport path, causing the at least one tray to rotate relative to the conveyance apparatus, to the first position; and sensing, with a sensing apparatus, operably associated with the conveyance apparatus, the positions of the at least one tray along the transport path and actuating the shifting member to move between the first and second positions, in response to the location of the at least one tray along the transport path.

The shifting member comprises an extensible/compressible member.

The step of sensing the positions of the at least one tray along the transport path comprises the steps of:

detecting arrival of the at least one tray at a preselected position upstream of the shifting member, with a tray approach sensor;

detecting arrival of a portion of the at least one tray at a preselected position downstream of the shifting member, with a tray rotation sensor; and actuating the shifting member to move to the first position when the tray approach sensor detects arrival of the at least one tray at the preselected position upstream of the shifting member and to actuate the shifting member to move to the second position when the tray rotation sensor detects arrival of the portion of the at least one tray at the preselected position downstream of the shifting member, with a programmable control unit.

The tray approach sensor and tray rotation sensors preferably comprise photocells. Alternatively, the tray approach sensor and tray rotation sensors comprise magnetic induction sensors.

The step of placing at least one first score line into at least one dough loaf, when at least one dough loaf is held within the at least one tray, with a first scoring tool, positioned downstream of the first means for altering the orientation of the at least one tray comprises the step of positioning at least one knife, proximate to the conveyance apparatus, which is configured to cut at least one first slot into an upper surface of at least one dough loaf, when at least one dough loaf is held within the at least one tray. Preferably, the at least one knife is circular. The at least one knife may be rotatably mounted on an axle passing through the at least one knife's center. Alternatively, the at least one knife may be fixedly mounted to an axle passing through the center of the knife, with the axle being operably configured to rotate about its longitudinal axis, to, in turn, rotate the knife.

The step of altering the orientation of the at least one tray, a second time, relative to the conveyance apparatus preferably comprises the steps of:

releasably engaging a rear side wall of the at least one tray, as the at least tray is transported along the transport path, to rotate the at least one tray about a first axis, and change the orientation of the at least one tray relative to the conveyance apparatus, with a hook, operably disposed relative to the conveyance apparatus, along the transport path; and contacting the at least one tray, after the tray has rotated a predetermined amount, and rotating the at least one tray about a second, different axis, to pivot the at least one tray away from the hook, with a bumper, operably disposed relative to the conveyance apparatus, at a position downstream of the hook.

The step of placing at least one second score line into at least one dough loaf, when at least one dough loaf is held within the at least one tray, with a second scoring tool, positioned downstream of the second means for altering the orientation of the at least one tray comprises the steps of:

cutting at least one second slot into an upper surface of the at least one dough loaf, when at least one dough loaf is held within the at least one tray, with at least one knife.

BEST MODE FOR PRACTICING THE INVENTION

While this invention is susceptible of embodiment in many different forms, this disclosure and the referenced drawings describe a particular embodiment in detail. This disclosure shall be considered only to provide an example of the principles of the invention. It is not intended to limit the invention to the illustrated embodiment.

Figure 1:
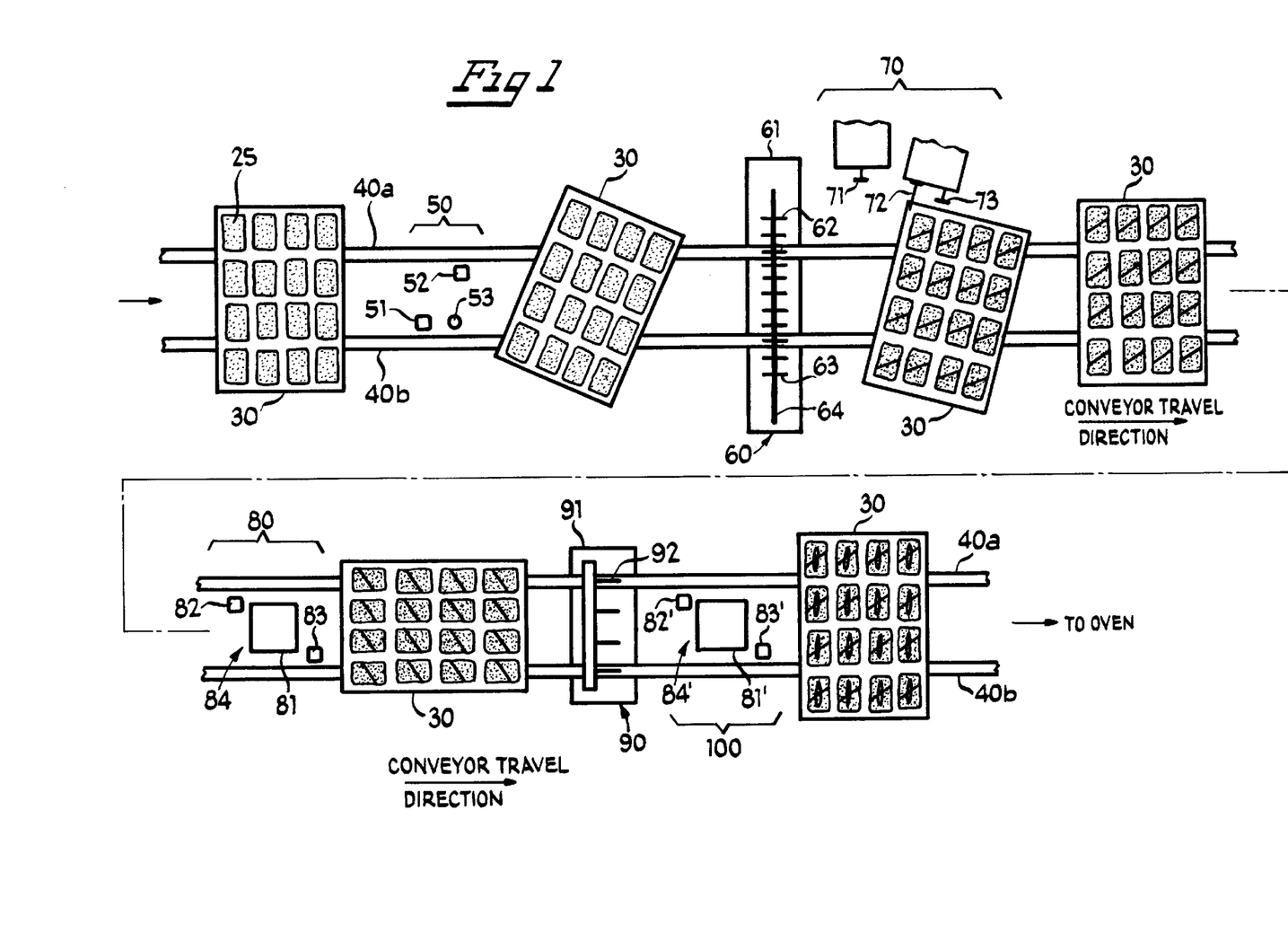
FIG. 1 is a top plan view of an apparatus comprising an embodiment of the invention.

FIG. 1 schematically illustrates an apparatus for automatically scoring the tops of unbaked bread dough loaves in two different directions. The apparatus is comprised of a tray 30, a conveyor 40, a skewing station 50, a first scoring station 60, a realignment station 70, a first turning station 80, a second scoring station 90, and a second turning station 100. Conveyor 40 automatically moves tray 30 sequentially through each of the processing stations listed above.

Tray 30 bearing unbaked bread dough loaves 25 is placed on conveyor 40. Conveyor 40 advances tray 30 to skewing station 50, where tray 30 is skewed relative to conveyor 40's travel direction. Next, skewed tray 30 is advanced through first scoring station 60, where an array of knives 62 scores the tops of bread dough loaves 25. Tray 30 is then advanced to alignment station 70 where the tray is realigned to its original orientation relative to conveyor 40. Next, tray 30 is advanced to first turning station 80, where tray 30 is rotated 90 degrees relative to conveyor 40's direction of travel. Conveyor 40 then advances tray 30 through second scoring station 90, where an array of knives 92 scores the tops of bread dough loaves 25 in a second orientation relative to the orientation of the scores imparted at first scoring station 60. Conveyor 40 continues to advance tray 30 second turning station 100, where tray 30 is rotated 90 degrees relative to the conveyor direction, returning tray 30 to its original configuration relative to conveyor 40. Conveyor 40 then transports tray 30 off-line or to another conveyor system for further processing, such as baking in an oven.

Figures 2, 4:
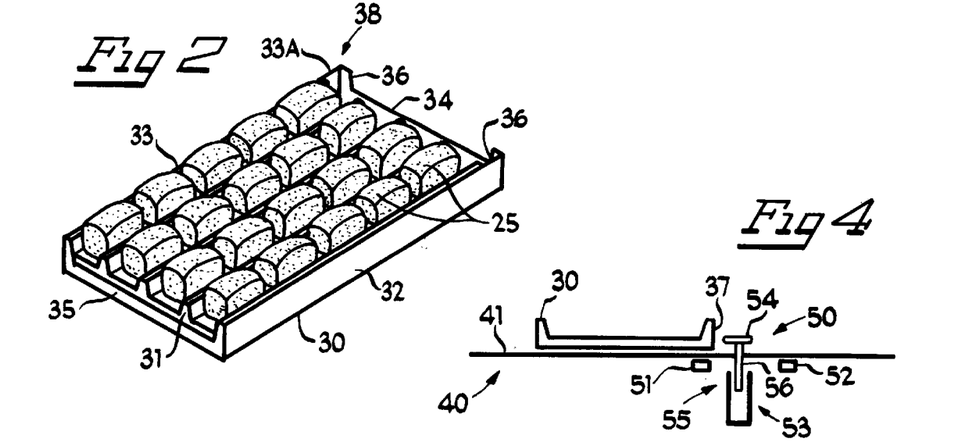
FIG. 2 is a perspective view of a tray bearing unbaked dough loaves.
FIG. 4 is an elevation view of a conveyor and a blocking unit in an extended position.

FIG. 2 shows unbaked bread dough loaves 25 preferably arranged uniformly on a tray 30. Although the loaves are shown as being generally oblong or rectangular, it is contemplated that the loaves may be round, square, or of other desired shapes.

Tray 30 comprises floor 31, front wall 32, rear wall 33, side walls 34 and 35, and transition regions 36. Rear wall 33 is taller than adjoining side walls 34 and 35. Side walls 34 and 35 blend into rear wall 33 and front wall 32 at transition regions 36. Although transition regions 36 are represented as beveled transitions, square or other transitions would also be suitable for this application. Although tray 30 is shown as rectangular, other polygonal shapes, such as square, may also suitable for this application.

Tray 30, bearing loaves 25, may be placed on top surface 41 of conveyor 40 manually or by automatic means. Conveyor 40 is contemplated to be of substantially conventional design, such as a conveyor supplied by Mechatherm S.A. of Strasbourg, France, and may be two parallel belts 40a and 40b, with a gap between them. Conveyor 40 is further contemplated to be power operated and automatically controlled by a conventional, programmable control unit (not shown). Conveyor 40 may comprise either a single, continuous conveyor unit, or a plurality of conveyor units. Conveyor 40 transports the tray to and through the various processing stations described above, beginning with skewing station 50.

The elements comprising skewing station 50 according to an embodiment of the invention, are shown schematically in FIGS. 1, 3, 4 and 9. Skewing station 50 comprises tray approach sensor 51, tray rotation sensor 52, blocking member 53, and a conventional, programmable control unit (not shown). Sensors 51 and 52 and blocking member 53 communicate with the control unit in a conventional manner.

Figure 3:
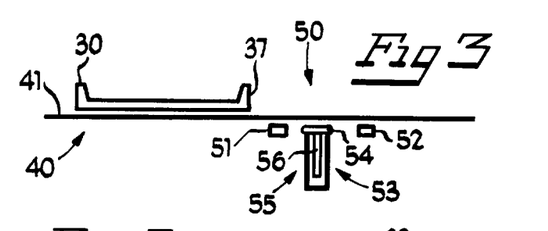
FIG. 3 is an elevation view of a conveyor and a blocking unit in a retracted position.
Figure 9:
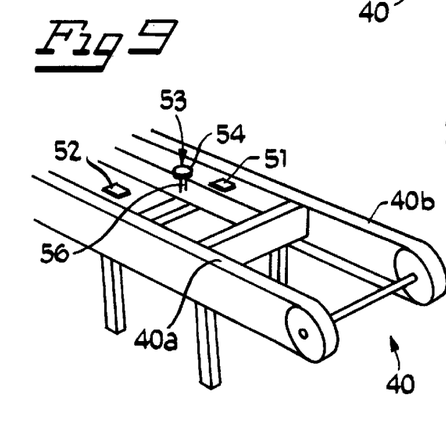
FIG. 9 is a perspective schematic illustration of the skewing station.

Tray approach sensor 51 and tray rotation sensor 52 are operably associated with conveyor 40 and are located below the conveyor's top surfaces 41, between belts 40a, 40b, so as not to obstruct the advancement of tray 30 as the tray travels along the conveyor. Sensors 51 and 52 are further located sufficiently close to the top surface 41 so that the sensors can detect the presence of tray 30 as the tray approaches the sensors. Blocking member 53 is also operably associated with conveyor 40. Blocking member 53 is located so that, in its retracted position, which will be explained in more detail elsewhere in this disclosure, it does not extend above top surface 41 of conveyor 40, so as to not undesirably obstruct the advancement of tray 30 as it advances along the conveyor.

If a solid conveyor belt or chain, or powered rollers are used, the sensors may be positioned elsewhere, relative to the conveyor, such as above the conveyer, suspended from a suitable framework.

Each of tray approach sensor 51 and tray rotation sensor 52 may be comprised of any suitable proximity sensor which is capable of generating a signal in response to detection of a body proximate the sensor, and sending such a signal to a remotely located control unit. It is contemplated that sensors 51 and 52 comprise conventional sensors such as photocells, magnetic induction sensor units, and the like.

Blocking member 53 may be comprised of any suitable, remotely and automatically controllable member which may be selectively inserted into the path of a portion of tray 30 as the tray advances along conveyor 40. In a preferred embodiment, blocking member may be comprised of a roller 54 attached to the shaft 56 of automatically controllable extensible/retractable member 55. The extensible/retractable member 55 may be conventional device, such as an electrically-operated solenoid device, a hydraulic piston/cylinder unit, a pneumatic piston/cylinder unit or other suitable device.

Extensible/retractable member 55 is fixed relative to conveyor 40 so that the shaft 56 is substantially perpendicular to top surface 41 of the conveyor 40. As previously stated, extensible/retractable member 55 is mounted so that no portion of blocking member 53 extends above top surface 41 of conveyor 40 when shaft 56 is in the retracted position, but so that roller 54 extends directly into the path of a portion of tray 30 when shaft 56 is in the extended position. When shaft 56 is in the extended position, roller 54 should be positioned so as to prevent tray 30 from undesirably riding up and over roller 54 and shaft 56.

In operation, conveyor 40 advances tray 30 towards tray approach sensor 51. When tray approach sensor 51 detects tray 30's presence, the tray approach sensor sends a signal to the control unit. The control unit, in turn, sends a signal to blocking member 53, causing blocking member 53 to be extended above the top surface 41 of conveyor 40, and into the path of the oncoming tray 30. When leading edge 37 of tray 30 contacts extended blocking member 53, the portion of the tray proximate the blocking member will be unable to continue to advance along conveyor 40. However, conveyor 40 continues to operate, and the portion of tray 30 which is not blocked by blocking member 53 continues to advance along the conveyor as a consequence of the frictional engagement of the tray and the conveyor. In this manner, tray 30 will rotate about the vertical axis defined by extended blocking member 53.

When tray 30 has rotated a predetermined amount, a portion of the tray will come into proximity with tray rotation sensor 52. When tray rotation sensor 52 detects the presence of tray 30, the sensor sends a signal to the control unit, which in turn sends a signal to the blocking member 53, causing the blocking member to retract to its initial position below the top surface 41 of conveyor 40. Once blocking member 53 has returned to its retracted position, skewed tray 30 continues to advance along conveyor 40. Although sensors 51 and 52 are described herein as signaling the presence of tray 30 to the control unit, it may be a subsequent change in signal, indicating the absence of the tray, that causes the control unit to direct the blocking member to change state from retracted to extended, and vice versa.

The predetermined degree of tray rotation may be achieved by varying the placement of sensors 51 and 52, the dimensions of tray 30, the speed of conveyor 40, the coefficient of friction between tray 30 and top surface 41 of conveyor 40, the placement of blocking member 53, the rate at which blocking member 53 can be extended and retracted, and the program logic of the control unit. The optimal sensor and blocking unit placement and control unit program logic will vary according to the various possible embodiments of the invention. Optimization of these parameters may be performed by one who is skilled in the art, having the present disclosure before them, without undue experimentation.

Figure 6:
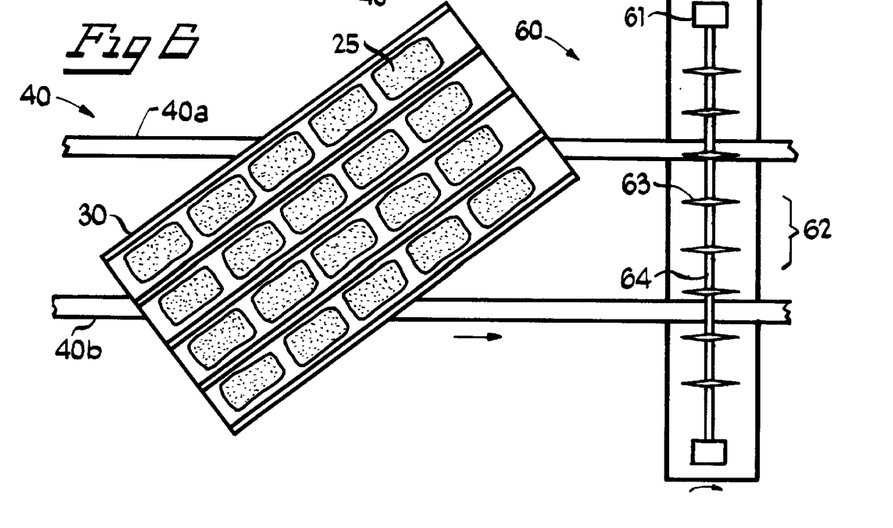
FIG. 6 is a top plan view thereof.

Conveyor 40 continues to advance now-skewed tray 30 towards and through first scoring station 60. Scoring station 60, as shown in FIGS. 1 and 6, comprises a support structure 61 which spans conveyor 40 and is stationary relative to the conveyor. First scoring station 60 further comprises an array of knives 62 which is affixed to support structure 61. The array of knives 62 may be configured so that the cutting edges 63 of the knives are preferably substantially parallel to and equidistant from each other. The array of knives 62 may be further configured so that the knives' cutting edges 63 are substantially parallel to conveyor 40's direction of travel and so that the knives come into contact with and score the tops of bread dough loaves 25 as conveyor 40 advances the tray 30 bearing bread dough loaves 25 underneath the knives.

Figure 5:
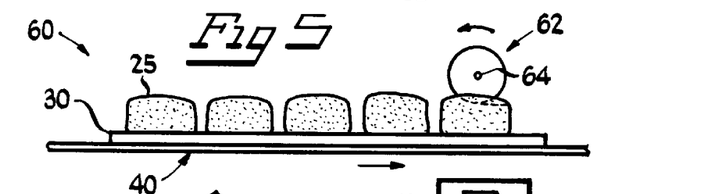
FIG. 5 is a schematic side elevation, of the first scoring station.

In a preferred embodiment, the array of knives 62 comprises a plurality of disc-shaped knives mounted on an axle 64 which passes through the knives' center axes. The knives 62 are preferably substantially equally spaced across axle 64. The number and spacing of the knives on the axle may be varied as desired to achieve a desired score pattern on the bread dough loaves 25.

The knives 62 may be rotatably mounted on the axle, or they may be rigidly affixed to the axle 64. In a preferred embodiment, it is contemplated that knives 62 are affixed to the axle 64, and that the axle is rotatingly driven by a conventional direct-drive motor or a motor-and-pulley system. The rotational speed of the knives may be varied by the user, using conventional gear reduction or motor speed controllers, to achieve effective and efficient scoring without undue tearing, distending, or slinging of the bread dough. It is contemplated that the rotational speed is dictated primarily by the dimensions of the knives, the conveyor speed, the consistency of the bread dough, and other factors.

Figure 10:
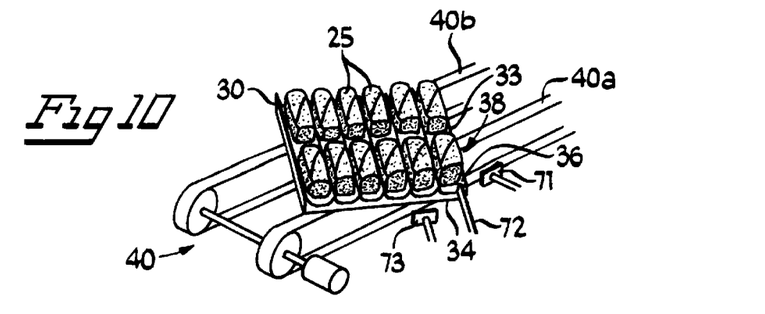
FIG. 10 is a perspective schematic illustration of the alignment station.

Conveyor 40 then advances tray 30 to alignment station 70, which is shown in FIGS. 1 and 10. Alignment station comprises a skid plate 71, a hook 72, and a bumper 73, each of which is operably associated with conveyor 40. It is contemplated that skid plate 71 may comprise a substantially flat, vertically oriented plate, which is parallel to conveyor 40's direction of travel. When tray 30 approaches alignment station 70, the side 34 of the tray may contact skid plate 71, in the event the tray is improperly situated off-center on conveyor 40. If this occurs, skid plate 71 will tend to relocate tray 30 towards the center of conveyor 40.

Hook 72 may comprise a rod which extends into the path of oncoming tray 30 as it advances along conveyor 40. The precise direction in which and the extent to which hook 72 extends into the path of tray is a function of the tray's dimensions, and the predetermined, skewed orientation in which the tray approaches alignment station 70. The proper size and orientation of hook 72 may be readily determined without undue experimentation by one who is skilled in the art.

As conveyor 40 continues to advance tray 30, hook 72 will eventually become releasably engaged with transition region 36 adjacent to rear wall 33 of tray 30 at corner 38, thus halting the advancement of corner 38 of the tray. However, conveyor 40 continues to operate, and as a consequence of the frictional engagement between tray 30 and top surface 41 of the conveyor, the remainder of tray 30 will rotate about a first vertical axis defined by the point of engagement between hook 72 and corner 38 of the tray.

When tray 30 has rotated a predetermined amount, a portion of side 34 of the tray will come into contact with bumper 73. Bumper 73 may be made of metal, rubber, plastic, or other suitable material, and is contemplated to have a convex, vertically oriented surface disposed towards the centerline of conveyor 40. As conveyor 40 continues to advance tray 30, after side wall 34 has contacted bumper 73, the tray will begin to rotate about a second vertical axis defined by the point of engagement between the side wall and the bumper. As the tray 30 rotates about bumper 73, rear wall 33 will eventually become disengaged with hook 72 and tray 30 will continue to advance along conveyor 40. At this point, tray 30 will have returned to substantially the same orientation it had, relative to the conveyor, prior to becoming skewed at skewing station 50. The relative placement and orientation of hook 72 and bumper 73 may be varied as necessary to accommodate trays of various dimensions and to accommodate various orientations of a tray on the conveyor.

Figure 11:
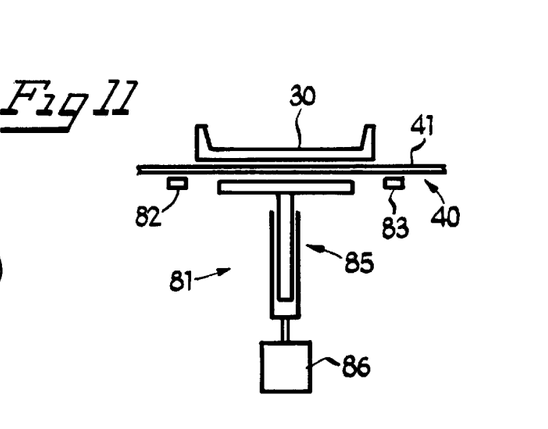
FIG. 11 is a side elevation of the first turning station.

Conveyor 40 then advances realigned tray 30 toward first turning station 80, shown in FIGS. 1 and 11. First turning station 80 is contemplated to be a conventional, commercially available unit, such as that supplied by Mechatherm S.A. of Strasbourg, France, and may comprise turntable 81, tray proximity sensors 82 and 83, and a conventional, programmable control unit (not shown). Turntable 81 is comprised of platform 84, extensible/retractable post 85, and servo 86 which rotates the post and platform.

When proximity sensors 82 and 83 detect the presence of tray 30, they send an appropriate signal to the control unit. The control unit then first sends a signal to extensible/retractable post 85, causing the post to extend, elevating platform 84, and, in turn, lifting tray 30 off of and above the top surface 41 of conveyor 40. The control unit then sends a signal to servo 86, causing the servo to rotate post 85, platform 86, and, in turn, tray 30, approximately 90 degrees relative to conveyor 40's direction of travel. Next, the control unit signals post 85 to retract, thus retracting platform 84 and, in turn, returning tray 30 to a position atop top surface 41 of conveyor 40. Conveyor 40 then transports tray 30 towards second scoring station 90.

Figure 7:
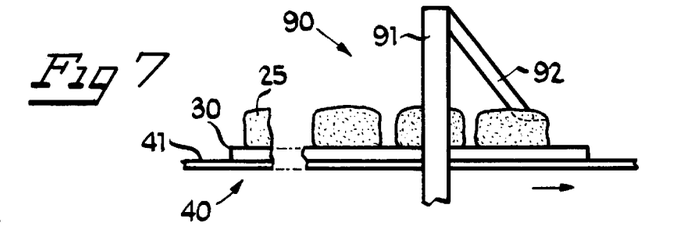
FIG. 7 is a schematic side elevation, of the second scoring station.
Figure 8:
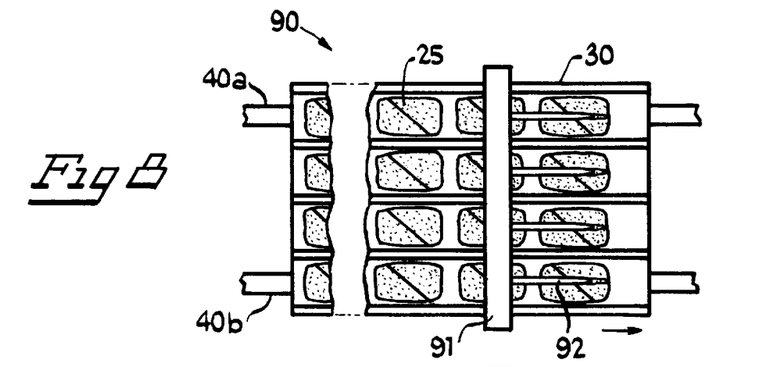
FIG. 8 is a top plan view thereof.

Second scoring station 90 is contemplated to be a conventional, commercially available unit, such as that supplied by Mechatherm S.A. of Strasbourg, France. Second scoring station 90, as illustrated in FIGS. 1, 7, and 8, is comprised of support structure 91 and an array of knives 92. The array of knives 92 is affixed to support structure 91 which is in turn operably associated with conveyor 40. The array of knives 92 is comprised of a plurality of flat, longitudinal knives, preferably spaced substantially equally along support structure 91. Knives 92 are mounted to support structure 91 at a predetermined angle relative to the plane of top surface 41 of conveyor 40. As conveyor 40 advances tray 30 through second scoring station 90, knives 92 cut a score line into the upper surfaces of bread loaves 25. The score lines are cut into the loaves 25 in a direction parallel to conveyor 40's direction of travel as the tray 30 is transported through the second scoring station.

Conveyor 40 then transports trays 30 from second scoring station 90 to second turning station 100. Second turning station 100 is contemplated to be a conventional, commercially available unit, such as that supplied by Mechatherm S.A. of Strasbourg, France. Moreover, second turning station 100 is contemplated to be configured and operated in substantially the same manner as first turning station 80. Second turning station 100 rotates tray 30 to its original orientation relative to conveyor 40. Conveyor 40 then transports tray 30 off-line or to another conveyor for further processing. The components comprising second turning station 100 are contemplated to be identical to those comprising first turning station 80 and therefore will not be described in detail. The components comprising second turning station are identified in FIG. 1 with the same reference numerals provided to identify the elements of first turning station 80, augmented by a prime ('). Those elements of second turning station 100 that are not illustrated in FIG. 1 may be structurally and functionally identical to their counterparts of the first turning station 80, as shown in FIG. 11.

Although the present invention is described with respect to the manufacture of bread rolls from bread dough, it is to be understood that the principles of the present invention may be adapted to other dough products, without departing from the principles of the present invention.

This description and the associated drawings merely explain and illustrate one possible embodiment of the invention. Those skilled in the art who have this disclosure before them will be able to make modifications and variations thereto without departing from the scope of the invention as claimed.

I claim:

1. An apparatus for cross-scoring upper portions of unbaked dough loaves, the apparatus comprising:
    at least one tray configured to hold at least one dough loaf;
    a conveyance apparatus operably configured for transporting the at least one tray along a transport path;
    first means for altering the orientation of the at least one tray, relative to the conveyance apparatus, while the at least one tray is being transported along the transport path, so as to shift the at least one tray from a first orientation relative to the conveyance apparatus, to a second orientation relative to the conveyance apparatus;
    a first scoring tool, positioned downstream of the first means for altering the orientation of the at least one tray, and operably configured to place at least one first score line into at least one dough loaf being held within the at least one tray;
    second means for altering the orientation of the at least one tray, relative to the conveyance apparatus, while the at least one tray is being transported along the transport path, and operably disposed downstream of the first scoring tool, so as to shift the at least one tray from the second orientation relative to the conveyance apparatus to a third orientation, relative to the conveyance apparatus;
    a second scoring tool, positioned downstream of the second means for altering the orientation of the at least one tray, and operably configured to place at least one second score line into at least one dough loaf being held within the at least one tray.

2. The apparatus according to claim 1, wherein the first means for altering the orientation of the at least one tray comprises:
    a selectively positionable shifting member selectively shiftable by an actuating device between a first position and a second non-obstructing position along the transport path of the at least one tray, so that when the shifting member is in the first position, the shifting member contacts and partially obstructs the at least one tray, as the at least one tray is transported along the transport path, causing the at least one tray to rotate relative to the conveyance apparatus; and
    a sensing apparatus, operably associated with the conveyance apparatus for detecting the presence of the at least one tray at a selected position along the transport path, and operably connected to the actuating device to cause the shifting member to move between the first and second positions, in response to the location of the at least one tray along the transport path.

3. The apparatus according to claim 2 wherein the shifting member comprises an extensible/compressible member.

4. The apparatus according to claim 2 wherein the sensing apparatus comprises:
    a tray approach sensor, operably disposed to detect arrival of the at least one tray at a preselected position upstream of the shifting member;
    a tray rotation sensor, operably disposed to detect arrival of a portion of the at least one tray at a preselected position downstream of the shifting member; and
    a programmable control unit operably configured to actuate the shifting member to move to the first position when the tray approach sensor detects arrival of the at least one tray at the preselected position upstream of the shifting member and to actuate the shifting member to move to the second position when the tray rotation sensor detects arrival of the portion of the at least one tray at the preselected position downstream of the shifting member.

5. The apparatus according to claim 4 wherein the tray approach sensor and tray rotation sensor comprise photocells.

6. The apparatus according to claim 4 wherein the tray approach sensor and tray rotation sensor comprise magnetic induction sensors.

7. The apparatus according to claim 1 wherein the first scoring tool comprises at least one knife which is configured to cut at least one first slot into an upper surface of at least one dough loaf being held within the at least one tray.

8. The apparatus according to claim 7 wherein the at least one knife is circular.

9. The apparatus according to claim 8 wherein the at least one knife is rotatably mounted on an axle passing through the at least one knife's center.

10. The apparatus according to claim 9 wherein the at least one knife is fixedly mounted to an axle passing through the center of the knife.

11. The apparatus according to claim 10 wherein the axle is operably configured to rotate about its longitudinal axis, to, in turn, rotate the knife.

12. The apparatus according to claim 1 wherein the second means for altering the orientation of the at least one tray comprises:
    a hook, operably disposed relative to the conveyance apparatus, along the transport path, and operably configured to releasably engage a rear side wall of the at least one tray, as the at least one tray is transported along the transport path, to rotate the at least one tray about a first axis, and change the orientation of the at least one tray relative to the conveyance apparatus; and a bumper, operably disposed relative to the conveyance apparatus, at a position downstream of the hook, and operably configured to contact the at least one tray, after the tray has rotated a predetermined amount, and rotate the at least one tray about a second, different axis, to pivot the at least one tray away from the hook.

13. The apparatus according to claim 1 wherein the second scoring tool comprises:

at least one knife which is configured to cut at least one second slot into an upper surface of the at least one dough loaf being held within the at least one tray.

14. A method for cross-scoring upper portions of unbaked dough loaves, the method comprising the steps of:

providing at least one tray configured to hold at least one dough loaf;

introducing at least one dough loaf into the at least one tray;

transporting the at least one tray with a conveyance apparatus along a transport path;

altering the orientation of the at least one tray, a first time, relative to the conveyance apparatus, while the at least one tray is being transported along the transport path, so as to shift the at least one tray from a first orientation relative to the conveyance apparatus, to a second orientation relative to the conveyance apparatus;

placing at least one first score line into said at least one dough loaf with a first scoring tool, positioned downstream of the first means for altering the orientation of the at least one tray;

altering the orientation of the at least one tray, a second time, relative to the conveyance apparatus, while the at least one tray is being transported along the transport path downstream of the first scoring tool, so as to shift the at least one tray from the second orientation relative to the conveyance apparatus to a third orientation, relative to the conveyance apparatus;

placing at least one second score line into said at least one dough loaf with a second scoring tool, positioned downstream of the second means for altering the orientation of the at least one tray.

15. The method according to claim 14, wherein the step of altering, a first time, the orientation of the at least one tray comprises:

moving a selectively positionable shifting member, selectively shiftable between a first position and a second non-obstructing position along the transport path of the at least one tray, so that when the shifting member is in the first position, the shifting member contacts and partially obstructs the at least one tray, as the at least one tray is transported along the transport path, causing the at least one tray to rotate relative to the conveyance apparatus, to the first position; and sensing, with a sensing apparatus, operably associated with the conveyance apparatus, the positions of the at least one tray along the transport path and actuating the shifting member to move between the first and second positions, in response to the location of the at least one tray along the transport path.

16. The method according to claim 15 wherein the shifting member comprises an extensible/compressible member.

17. The method according to claim 15 wherein the step of sensing the positions of the at least one tray along the transport path comprises the steps of:

detecting arrival of the at least one tray at a preselected position upstream of the shifting member, with a tray approach sensor;

detecting arrival of a portion of the at least one tray at a preselected position downstream of the shifting member, with a tray rotation sensor; and actuating the shifting member to move to the first position when the tray approach sensor detects arrival of the at least one tray at the preselected position upstream of the shifting member and to actuate the shifting member to move to the second position when the tray rotation sensor detects arrival of the portion of the at least one tray at the preselected position downstream of the shifting member, with a programmable control unit.

18. The method according to claim 17 wherein the tray approach sensor and tray rotation sensor comprise photocells.

19. The method according to claim 17 wherein the tray approach sensor and tray rotation sensor comprise magnetic induction sensors.

20. The method according to claim 14 wherein the step of placing at least one first score line into said at least one dough loaf with a first scoring tool, positioned downstream of the first means for altering the orientation of the at least one tray comprises the step of positioning at least one knife, proximate to the conveyance apparatus, which is configured to cut at least one first slot into an upper surface of said at least one dough loaf.

21. The method according to claim 20 wherein the at least one knife is circular.

22. The method according to claim 20 wherein the at least one knife is rotatably mounted on an axle passing through the at least one knife's center.

23. The method according to claim 22 wherein the at least one knife is fixedly mounted to an axle passing through the center of the knife.

24. The method according to claim 23 wherein the axle is operably configured to rotate about its longitudinal axis, to, in turn, rotate the knife.

25. The method according to claim 14 wherein the step of altering the orientation of the at least one tray, a second time, relative to the conveyance apparatus, comprises the steps of:

releasably engaging a rear side wall of the at least one tray, as the at least tray is transported along the transport path, to rotate the at least one tray about a first axis, and change the orientation of the at least one tray relative to the conveyance apparatus, with a hook, operably disposed relative to the conveyance apparatus, along the transport path; and contacting the at least one tray, after the tray has rotated a predetermined amount, and rotating the at least one tray about a second, different axis, to pivot the at least one tray away from the hook, with a bumper, operably disposed relative to the conveyance apparatus, at a position downstream of the hook.

26. The method according to claim 14 wherein the step of placing at least one second score line into said at least one dough with a second scoring tool, positioned downstream of the second means for altering the orientation of the at least one tray comprises the steps of:

cutting at least one second slot into an upper surface of the at least one dough loaf with at least one knife.

* * * * *

UNITED STATES PATENT AND TRADEMARK OFFICE
CERTIFICATE OF CORRECTION

PATENT NO. : 5,935,629
DATED : August 10, 1999
INVENTOR(S) : Martin

It is certified that error appears in the above-identified patent and that said Letters Patent is hereby corrected as shown below:

Column 10,
Line 47, delete "sensors" and insert -- sensor --

Column 12,
Line 60, after "dough", insert -- loaf --

Signed and Sealed this

Ninth Day of October, 2001

Attest:

*Nicholas P. Godici*

NICHOLAS P. GODICI
*Attesting Officer*  *Acting Director of the United States Patent and Trademark Office*